United States Patent [19]

Hirose

[11] Patent Number: 5,136,898
[45] Date of Patent: Aug. 11, 1992

[54] HYDRAULIC SYSTEM FOR CONTROLLING ENGAGEMENT OF FRICTIONAL COUPLING IN AUTOMATIC TRANSMISSION

[75] Inventor: Ikuo Hirose, Shizuoka, Japan
[73] Assignee: Jatco Corporation, Japan
[21] Appl. No.: 717,649
[22] Filed: Jun. 19, 1991
[30] Foreign Application Priority Data
  Jun. 21, 1990 [JP] Japan ................................. 2-163456
[51] Int. Cl.⁵ ............................................. B60K 41/04
[52] U.S. Cl. ................................. 74/867; 137/625.6; 251/47
[58] Field of Search ............... 74/867, 868; 137/625.6; 251/47

[56] References Cited

U.S. PATENT DOCUMENTS

| | | | |
|---|---|---|---|
| 4,722,251 | 2/1988 | Sumiya et al. | 74/867 X |
| 4,807,496 | 2/1989 | Hayasaki et al. | 74/867 X |
| 4,889,016 | 12/1989 | Kuwayama et al. | 74/868 |
| 4,911,036 | 3/1990 | Ueki et al. | 74/869 X |
| 4,938,103 | 7/1990 | Sugano | 74/867 |
| 4,972,739 | 11/1990 | Ueki et al. | 74/868 |

FOREIGN PATENT DOCUMENTS
1-116352  5/1989  Japan .

Primary Examiner—Richard Lorence
Assistant Examiner—William O. Trousdell
Attorney, Agent, or Firm—Ronald P. Kananen

[57] ABSTRACT

In order to improve only a pressure variation characteristic of hydraulic fluid supplied to a hydraulically actuable frictional coupling, but also a pressure variation characteristic thereof discharged from the coupling, a pressure regulator valve is provided which has a signal pressure port connected via a fluid passage to a shift valve. An accumulator is connected to the fluid passage at a portion between one end and an opposite end of the fluid passage. The pressure regulator valve is operative to cause a change in hydraulic fluid pressure supplied to the coupling in response to a change in a signal pressure at the signal pressure port.

7 Claims, 2 Drawing Sheets

HYDRAULIC SYSTEM FOR CONTROLLING ENGAGEMENT OF FRICTIONAL COUPLING IN AUTOMATIC TRANSMISSION

BACKGROUND OF THE INVENTION

The present invention relates to a hydraulic system of an automatic transmission, and more particularly to a hydraulic system for controlling a change in hydraulic fluid pressure upon not only supply of hydraulic fluid to, but also discharge thereof from a hydraulically actuable frictional coupling of an automatic transmission.

Japanese Patent First (unexamined) Publication No. 1-116352 discloses a hydraulic system which comprises a hydraulically actuable frictional coupling, a shift valve arranged to receive a pressurized hydraulic fluid from a source of pressurized hydraulic fluid, i.e., a line pressure regulator, a first fluid passage having one end connected to the shift valve and an opposite end, and a pressure regulator valve having an inlet port connected to the opposite end of the first fluid passage. An outlet port of the pressure regulator is connected to one end of a second fluid passage having an opposite end connected to the coupling. The pressure regulator valve has a drain port and a signal pressure port connected to a pressure modifier valve which generates a throttle valve opening related pressure which is called a pressure modifier pressure. A pressure accumulator is operatively coupled with the pressure regulator and has a reciprocal piston defining a variable volume chamber communicating with the second fluid passage at a portion between one end and an opposite end thereof. A common spring operatively disposed between the reciprocal piston and a spool of the pressure regulator valve to increase a spring force with which the spring biases the spool during stroke of the reciprocal piston upon supply of hydraulic fluid to the coupling. In order to discharge hydraulic fluid from the second fluid passage directly to the first fluid passage bypassing the pressure regulator valve, a one-way valve is fluidly disposed between the first fluid passage and the second fluid passage. Thus, a pressure variation characteristic during a shift to a release or a disengaged position of the coupling is not controlled by the pressure regulator valve.

An object of the present invention is to improve a hydraulic system of the above kind such that the pressure regulator valve can control a pressure variation characteristic during a shift to the release or the disengaged position of the hydraulically actuable frictional coupling.

SUMMARY OF THE INVENTION

According to the present invention, there is provided a hydraulic system comprising:

a hydraulically actuable frictional coupling;

a source of pressurized hydraulic fluid;

a shift valve arranged to receive a pressurized hydraulic fluid from said source of pressurized hydraulic fluid;

a fluid passage having one end connected to said shift valve and an opposite end, said fluid passage having a portion between said one end and said opposite end;

an accumulator having a reciprocal piston defining a variable volume chamber communicating with said fluid passage at said portion thereof;

a pressure regulator valve having a signal pressure port connected to said opposite end of said fluid passage, said pressure regulator valve including pressure responsive means for controlling supply of hydraulic fluid to and discharge thereof from said hydraulically actuable frictional coupling in response to a signal pressure at said signal pressure port.

DETAILED DESCRIPTION OF THE INVENTION

Figure 1:
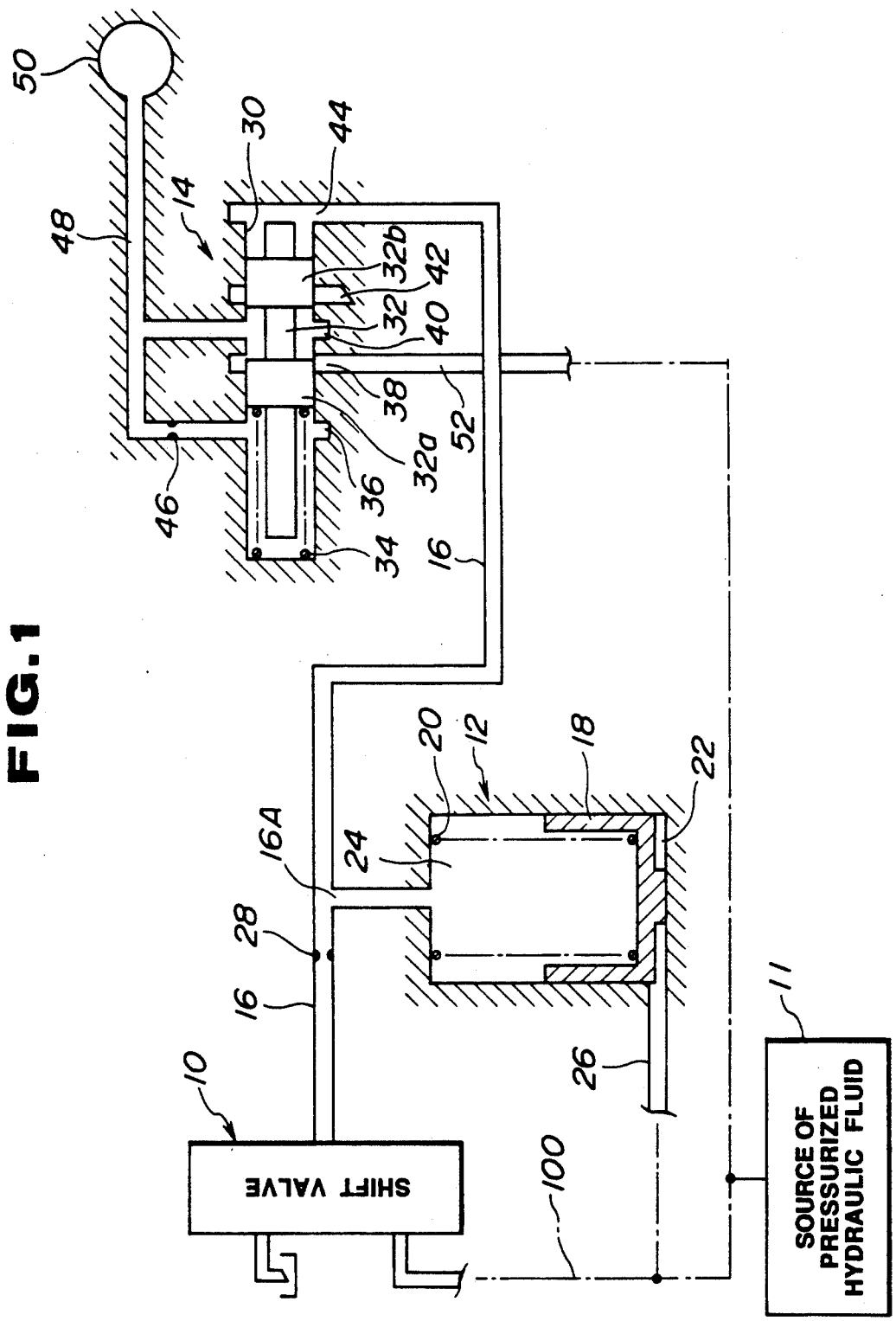
FIG. 1 is a circuit diagram of a first embodiment of a hydraulic system according to the present invention.

Referring to the accompanying drawings, FIG. 1 is a circuit diagram for explaining a first embodiment of a hydraulic system for controlling a shift in an automatic transmission. The hydraulic system comprises a shift valve 10, a source of pressurized hydraulic fluid 11, an accumulator 12 and a pressure regulator valve 14. Illustrated by one dot chain line and designated by the reference numeral 100 is a fluid network fluidly disposed between them. A first fluid passage 16 has one end connected to the shift valve 10 and an opposite end. This fluid passage 16 has a portion 16A between the one and opposite ends, and an orifice 28 between the portion 16A and the one end at which the shift valve 10 is connected to. The shift valve 10 is arranged to receive a pressurized hydraulic fluid under line pressure from the source 11. Although not specifically explained, the source of pressurized hydraulic fluid 11 is constructed and arranged to generate a line hydraulic fluid pressure that is variable with a varying load of an engine, not shown, with which the automatic transmission is associated. The shift valve 10 is shiftable in response to a relation of vehicle speed to the engine throttle valve opening degree between one position wherein pressurized hydraulic fluid under line pressure is supplied to a first fluid passage 16 and another position wherein hydraulic fluid is discharged from the first fluid passage 16. The accumulator 12 has a reciprocal piston 18 and a spring 20. The piston 18 has one end defining a back-up pressure chamber 22 and an opposite end defining a variable volume working pressure chamber 24. Supplied to the back-up chamber 22 is the line pressure. The variable volume chamber 24 communicates with the first fluid passage 16 at the portion 16A. The pressure regulator valve 14 has a valve bore 30 and comprises a spool 32 slidably disposed in the valve bore 30 and a spring 34 disposed in the valve bore 30. The spool 32 has two lands 32a and 32b. The spring 34 biases the spool 32 to the right as viewed in FIG. 1. The valve bore 30 is formed with five ports 36, 38, 40, 42 and 44. The port 36 is a feedback port and communicates via an orifice 46 with a second fluid passage 48. The second fluid passage 48 is connected to a hydraulic servo device of a hydraulically actuable frictional coupling in the form of a clutch 50. The inlet port 38 is an port which is connected to a fluid passage 56 that is supplied with the pressurized hydraulic fluid under line pressure. The port 40 is an outlet port connected to the second fluid line 48. The port 42 is a drain port. The port 44 is a signal pressure port connected to the opposite end of the first fluid passage 16 to receive hydraulic fluid pressure at the opposite end of the first fluid passage 16 as a signal pressure. The land 32b of the spool 32 has a pressure acting area exposed to the signal pressure at the signal pressure port 44 to be urged to move against the spring 34, while the land 32a of the spool 32 has a pressure acting area exposed to a feedback pressure at the feedback port 36 to be urged to move in such a direction as to assist the action of the spring 34. The spool 32 has a spring set position wherein the inlet port 38 is covered by the land 32a and the drain port 42 is uncovered by the land 32b to discharge hydraulic fluid from the outlet port 40 toward the drain port 42. The spool 32 has a balanced position for pressure regulation, as illustrated in FIG. 1, wherein a portion of inflow of hydraulic fluid from the inlet port 38 is discharged from the drain port 42 and thus a change in the signal pressure at the signal pressure port 44 causes a change in hydraulic fluid pressure at the outlet port 40.

The operation is now explained.

When the shift valve 10 is in the position wherein the first fluid passage 16 is drained, no hydraulic fluid pressure acts on the signal pressure port 44 and thus the spool 32 is biased by the spring 34 to assume the first limit position wherein the outlet port 40 is allowed to communicate with the drain port 42 and it is prevented from communicating with the inlet port 38. Under this condition, the second fluid passage 48 is drained via the drain port 42, and no hydraulic fluid pressure acts on the clutch 50. Since no hydraulic fluid pressure is present in the variable volume chamber 24, the back-up pressure in the chamber 22 urges the piston 18 upwardly as viewed in FIG. 1 against the action of the spring 20. The spring 20 is therefore compressed.

If the shift valve 10 shifts from the above-mentioned position to the another position, the pressurized hydraulic fluid under line pressure is delivered to the first fluid passage 16. Initially, the hydraulic fluid pressure applied to the signal pressure port 44 increases quickly to a first pressure value until the piston 18 of the accumulator 12 begins to stroke. When the hydraulic fluid pressure exceeds this first pressure value, the piston 18 of the accumulator 12 begins to stroke in a direction to increase the volume of the variable volume chamber 24. The setting of the spring 34 of the pressure regulator valve 14 is such that the spool 32 moves to the left, as viewed in FIG. 1, to the balanced position as illustrated in FIG. 1 when the signal pressure at the signal pressure port 44 exceeds the first pressure value. The hydraulic fluid pressure increases slowly at a gradual rate during a stroke of the piston 18 of the accumulator 12. As will be readily seen from the construction of the pressure regulator valve 14, an increase in hydraulic fluid pressure in the second fluid passage 48 is substantially at the same gradual rate as the hydraulic fluid at the signal pressure port 44 increases. The clutch 50 is designed such that it starts engaging while the hydraulic fluid pressure in the second fluid passage 48 increases at the gradual rate. Upon and after completion of the stroke of the piston 18 of the accumulator 12, the hydraulic fluid pressure at the signal pressure port 44 rapidly increases up to a level as high as the line pressure. Thus, the pressure applied via the second fluid line 48 to the clutch 50 becomes the maximum.

If the shift valve 10 is shifted back to the position wherein the fluid line 16 is drained in order to release engagement of the clutch 50, the hydraulic fluid pressure at the signal pressure port 44 decreases quickly down to a second pressure value until the piston 18 of the accumulator 12 begins to stroke against the spring 20. After the piston 18 has begun stroking against the spring 20, the hydraulic fluid is displaced out of the regulated pressure chamber 24 to the first fluid line 16. Thus, the hydraulic fluid at the signal pressure port 44 decreases slowly at a gradual rate. Under this condition, the pressure regulator valve 14 stays in the balanced position as illustrated in FIG. 1, allowing the hydraulic fluid pressure in the second fluid passage 48 to decrease at the same gradual rate as the hydraulic fluid pressure at the port 44 does. Thus, disengagement of the clutch 50 progresses gradually. Upon and after completion of the stroke of the piston 18 of the accumulator 12, the hydraulic fluid pressure at the signal pressure port 44 decreases rapidly to zero, causing the spool 32 of the regulator valve 14 to assume the spring set position wherein the outlet port 40 communicates with the drain port 42 and it is prevented from communicating with the inlet port 38. Thus, the clutch 50 becomes depressurized completely.

From the preceding description of the first embodiment, it is now appreciated that a rate of change in the hydraulic fluid pressure with which the clutch 50 engages or disengages is made gradual and determined in accordance with a characteristic of the accumulator 12. Thus, the capacity and timing upon not only engagement of the clutch 50 but also release thereof are easy to adjust. The gradual rate of pressure variation characteristic of the hydraulic fluid pressure is determined by the characteristic of the accumulator 12. Thus, different pressure variation characteristics can be obtained by different accumulators with different characteristics.

In the previously described embodiment, the line pressure variable with the throttle valve opening degree is used and this engine load related line pressure is supplied via the first fluid passage 16 to the variable volume chamber 24 and the signal pressure port 44 of the pressure regulator valve 14. Thus, the hydraulic fluid pressure supplied to the clutch 50 via the second fluid passage 48 during pressure regulation by the pressure regulator valve 14 is related to the engine load. If desired, it is possible to apply a throttle pressure directly to the spool 32 of the pressure regulator valve 14. In this case, the spool 32 should be formed with another land with a pressure acting area which the throttle pressure acts on. The direction of this pressure acting area is such that the spool 32 is urged to move to the left, as viewed in FIG. 1, in response to the magnitude of the throttle pressure applied to the spool 32.

Figure 2:
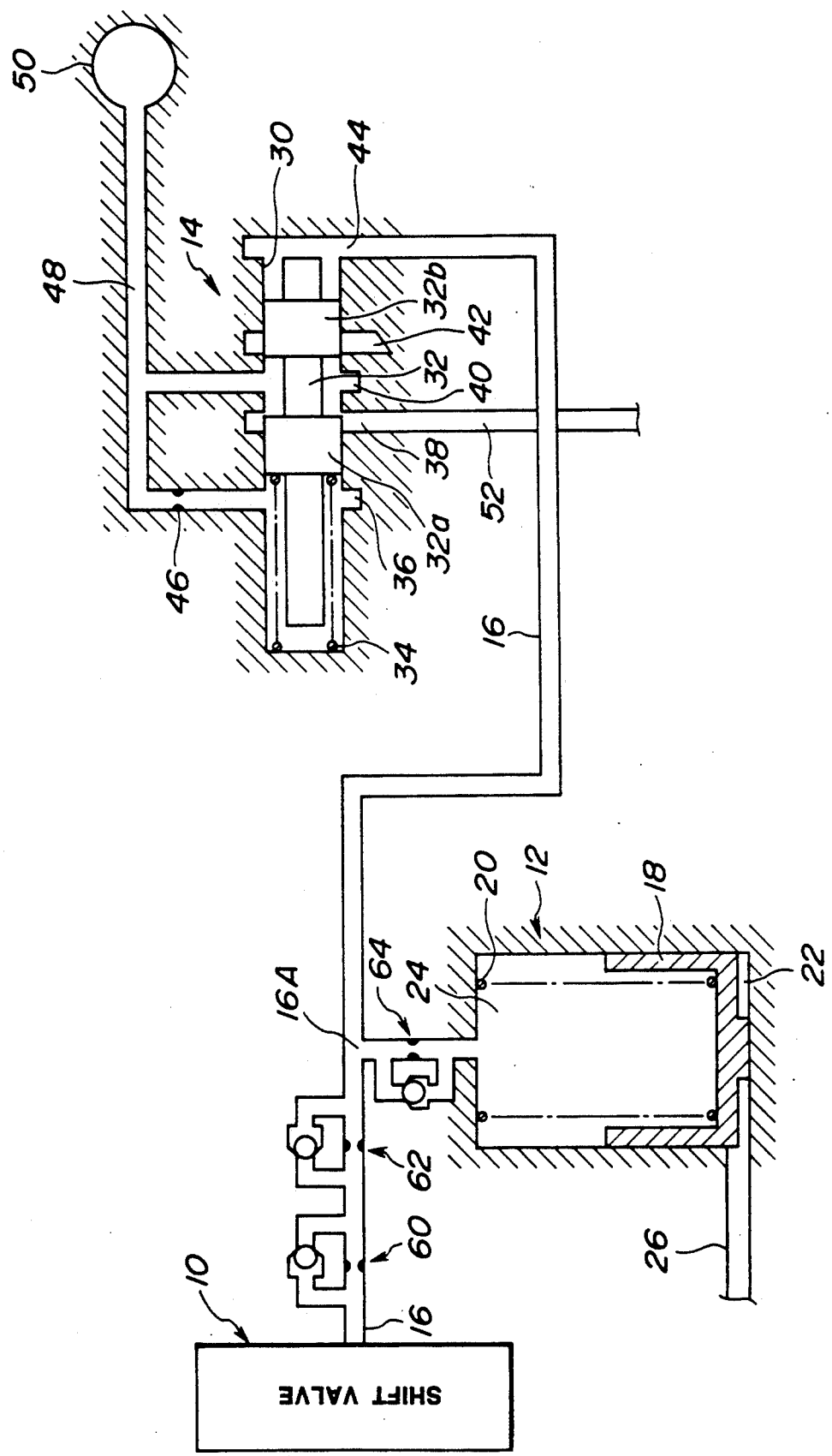
FIG. 2 is a similar view to FIG. 1 illustrating a second embodiment.

A second embodiment is explained in connection with FIG. 2. The second embodiment is substantially the same as the first embodiment but different from the latter mainly in the provision of an one-way orifice 64 between a variable volume chamber 24 of an accumulator 12 and a first fluid passage 16, and also in the provision of two tandem one-way orifices 60 and 62 in the place of the orifice 28 of the first embodiment. The direction of the one-way orifice 64 is such that outflow of hydraulic fluid from the first fluid passage 16 to the accumulator 12 is unrestricted, but inflow of hydraulic fluid to the first fluid passage 16 from the accumulator 12 is restricted. The directions of the tandem one-way orifices 60 and 62 are such that flow of hydraulic fluid through the first fluid passage 16 is restricted by the one-way orifice 60 only during a shift to engagement position of a clutch 50, while flow of hydraulic fluid through the first fluid passage 16 is restricted by the other one-way orifice 62 only.

The operation of the second embodiment is explained assuming that the degree of flow restriction provided by the one-way orifice 60 is the same as that of the orifice 28. During a shift to the engagement position of the clutch 50, flow of hydraulic fluid through the first fluid passage 16 is not influenced by the one-way orifice 62 and outflow of hydraulic fluid from the first fluid passage 16 toward the accumulator 12 is not influenced by the one-way orifice 64. Thus, the pressure variation characteristic is the same as that of the first embodiment. During a shift to a release or a disengagement position of the clutch 50, outflow of hydraulic fluid is restricted by the one-way orifice 62 and an inflow of hydraulic fluid is restricted by the one-way orifice 64. Thus, a different pressure variation characteristic from that of the first embodiment is provided. The pressure variation characteristic provided by the second embodiment may be altered by varying the relationship between the degree of restriction of the one-way orifice 62 and the degree of restriction of the one-way orifice 64.

In the pressure variation characteristic during shift to a release position of the clutch 50, the degree of flow restriction of the one-way orifice 64 is responsible for a rate of drop in hydraulic pressure during stroke of the piston 18 of the accumulator 12. Thus, if the degree of restriction is increased, the rate of drop increases.

What is claimed is:

1. A hydraulic system comprising:
   a hydraulically actuable frictional coupling;
   a source of pressurized hydraulic fluid;
   a shift valve arranged to receive a pressurized hydraulic fluid from said source of pressurized hydraulic fluid;
   a fluid passage having one end connected to said shift valve and an opposite end;
   an orifice disposed between said one end and said opposite end of said fluid passage;
   an accumulator having a reciprocal piston defining a variable volume chamber communicating with said fluid passage at a portion between said one end and said opposite end offsetting from a position where said orifice is provided toward said opposite end; and
   a pressure regulator valve having a signal pressure port connected to said opposite end of said fluid passage, said pressure regulator valve including pressure responsive means for controlling a supply of hydraulic fluid to and discharge thereof from said hydraulically actuable frictional coupling in response to a signal pressure at said signal pressure port.

2. A hydraulic system as claimed in claim 1, wherein an one-way orifice is fluidly disposed between said fluid passage and said variable volume chamber of said accumulator.

3. A hydraulic system as claimed in claim 2, wherein said fluid passage has two tandem one-way orifices fluidly disposed therein between said one end and said portion.

4. A hydraulic system as claimed in claim 1, wherein said means of said pressure regulator valve includes an inlet port arranged to receive a pressurized hydraulic fluid from said source of pressurized hydraulic fluid, an outlet port communicating with said hydraulically actuable frictional coupling, a feedback port communicating with said outlet port, a drain port, a spool, and a spring arranged to bias said spool in a first direction, said spool having a first pressure acting area exposed to said signal pressure at said signal pressure port to be urged against said spring in a second opposite direction and a second pressure acting area exposed to a hydraulic fluid pressure at said feedback port to be urged in said first direction.

5. A hydraulic system as claimed in claim 4, wherein said spool has a first position wherein said inlet port is covered and said drain port is uncovered to discharge hydraulic fluid from said outlet port toward said drain port, and a balanced position for pressure regulation wherein a change in said signal pressure causes a change in hydraulic fluid pressure at said outlet port.

6. A hydraulic system as claimed in claim 1, wherein said piston of said accumulator defines a back-up pressure chamber arranged to receive a hydraulic fluid pressure from said source of pressurized hydraulic fluid, and a spring disposed in said variable volume chamber to bias said piston against a back-up pressure within said back-up pressure chamber.

7. A hydraulic system comprising:
   a hydraulically actuable frictional coupling;
   a source of pressurized hydraulic fluid;
   a shift valve arranged to receive a pressurized hydraulic fluid from said source of pressurized hydraulic fluid;
   a fluid passage having one end connected to said shift valve and an opposite end, said fluid passage having a portion between said one and said opposite ends;
   an accumulator having a reciprocal piston defining a variable volume chamber communicating with said fluid passage at said portion thereof;
   a pressure regulator valve having a signal pressure port connected to said opposite end of said fluid passage, said pressure regulator valve including pressure responsive means for controlling a supply of hydraulic fluid to and discharge thereof from said hydraulically actuable frictional coupling in response to a signal pressure at said signal pressure port;
   a one-way orifice fluidly disposed between said portion of said fluid passage and said variable volume chamber of said accumulator; and
   two tandem one-way orifices fluidly disposed in said fluid passage between said one end and said portion.

* * * * *